United States Patent [19]

Benefiel

[11] Patent Number: 4,794,154

[45] Date of Patent: Dec. 27, 1988

[54] TWO-COMPONENT URETHANE CONTAINING BLOCKED ISOCYANATE

[75] Inventor: James W. Benefiel, Northville, Mich.

[73] Assignee: BASF Corporation, Clifton, N.J.

[21] Appl. No.: 190,788

[22] Filed: May 6, 1988

[51] Int. Cl.[4] .............................................. C08G 18/80
[52] U.S. Cl. .................... 528/45; 427/385.5
[58] Field of Search ........................ 528/45; 427/385.5

[56] References Cited

U.S. PATENT DOCUMENTS

| | | | |
|---|---|---|---|
| 3,385,829 | 12/1964 | Heydkamp | 260/75 |
| 4,195,148 | 7/1978 | Hagen | 528/48 |
| 4,234,445 | 1/1979 | Hagen | 528/64 |
| 4,252,923 | 9/1979 | Konig et al. | 525/452 |
| 4,369,301 | 10/1981 | Konig et al. | 528/45 |
| 4,410,679 | 12/1981 | Holubka et al. | 528/45 |
| 4,410,689 | 6/1982 | Barsa et al. | 528/45 |
| 4,412,034 | 5/1981 | Meyer et al. | 528/45 |
| 4,439,593 | 5/1983 | Kelso et al. | 528/45 |
| 4,442,146 | 4/1983 | Holubka et al. | 528/45 |
| 4,456,738 | 1/1983 | Holubka et al. | 528/45 |
| 4,456,740 | 1/1983 | Holubka et al. | 528/45 |

*Primary Examiner*—Maurice J. Welsh
*Attorney, Agent, or Firm*—Emil Richard Skula

[57] ABSTRACT

A two-component polyurethane coating kit having a first component including a blocked isocyanate housed in a first container and a second component including an isocyanate-reactive compound housed in a separate container. The blocked isocyanate component unblocks at low temperatures due to the particular blocking agents used. When contacted with one another, the first and second components react to form a polyurethane coating composition. Also disclosed are a method of applying this polyurethane coating and an article of manufacture coated with this coating.

8 Claims, No Drawings

TWO-COMPONENT URETHANE CONTAINING BLOCKED ISOCYANATE

FIELD OF THE INVENTION

The present invention relates to a two-component urethane coating including blocked isocyanate, a method of applying the two-component urethane coating onto a substrate and articles coated with the two component urethane coating of the present invention. More particularly, the two-component coating includes one component comprising blocked isocyanate and a second component comprising at least one isocyanate-reactive compound.

BACKGROUND OF THE INVENTION

In general, polyurethane paint compositions can be classified into two types. In the first type the two components of the urethane, namely the isocyanate-reactive an the isocyanate-containing component are mixed together in a single container. In these systems, the isocyanate groups are blocked by blocking agents such as alcohols, oximes, amides, phenols, and ketoximes, among other blocking agents in order to prevent reaction between the isocyanates and the isocyanate-reactive component during storage. To apply these coatings the mixture is applied to a substrate and heated above the blocking temperature to unblock the isocyanates and render them reactive. This, in turn, causes curing of the coating by the ensuing reaction between the unblocked isocyanates and the isocyanate-reactive component.

The second type of polyurethane composition is a two component system which is packaged in two separate containers. In this system the isocyanate component is stored in a separate container from the isocyanate-reactive component. Typically, the isocyanate component contains only free isocyanates since it is physically isolated from the isocyanate-reactive component by storage in separate containers. This system has the advantage of curing at low temperatures because there is no need to heat the composition to unblock the isocyanates. However, this type of urethane composition has the disadvantage that, during application, workers are exposed to the free isocyanates which are highly toxic.

The two component, single-container system is generally easier to apply since no mixing is required. Further, since the isocyanate groups are blocked, the toxicity associated with application of the polyurethane coating is minimized because the exposure of workers to free isocyanates is substantially reduced. Examples of these types of urethane systems can be found in U.S. Pat. Nos. 4,439,593; 4,412,034; 4,410,689; 4,410,769; 4,456,740; 4,442,146 and 4,456,738. In these systems, the isocyanate groups are blocked by blocking agents such as alcohols, oximes, amides, phenols and ketoximes, among other blocking agents. These compositions generally cure at high temperatures. Blocked isocyanates blocked with other blocking agents and having low curing temperatures are generally unstable under standard storage conditions when in admixture with isocyanate-reactive compounds such as polyhydroxylates and thus are not generally useful in the single container system.

The blocked isocyanate-containing polyurethane compositions which are packaged in a single container are cured by displacing the blocking agents with a co-reactant at temperatures of about 120° C. to 250° C. Upon curing, the blocking agent is released and usually volatilizes from the coating. The resulting free isocyanates are then able to react with active isocyanate-reactive compounds to form thermally stable urethane or urea linkages. In general, blocked aromatic polyisocyanates have lower dissociation temperatures than blocked aliphatic polyisocyanates. Further, the dissociation temperatures of blocked isocyanates is directly affected by the particular blocking agent employed. The most significant problem with two-component, single container polyurethane coating is that they generally cure at relatively high temperatures in excess of 120° C. All two-component single container coatings curing at temperatures below 120° C. generally exhibit poor storage stability and the lower the curing temperature the less storage stability the urethane will have.

An example of a two-component, two-container urethane system is described in U.S. Pat. No. 3,385,829. These two-container systems typically contain free isocyanates, cure at low temperatures and produce high gloss, durable films which possess good solvent and chemical resistance. These properties, along with their hardness, have made two-container polyurethane coatings a standard for aircraft and automotive finish and maintenance applications.

In use, these two-component, two-container polyurethanes are mixed just prior to their application. Typically, these two container systems have a limited pot life after mixing during which the mixture retains its liquid form. Thereafter, curing occurs at room temperature as urethane linkages begin formation by reaction of the free isocyanates with the isocyanate-reactive componet.

Although these two-component, two container urethane systems are advantageous because of their low curing temperatures, they exhibit significant drawbacks as well. For example, the presence of free isocyanates in the mixtures is highly undesirable since such free isocyanates are extremely toxic, particularily with respect to the personnel charged with their application. In addition, these two-component, two-container systems often continue to harden after curing and result in brittle, inflexible cured coatings. Such coatings exhibit poor resistance to chipping and are often difficult to repair. In addition, great care must be employed in the handling of the isocyanate portion since it will react with water including moisture from the surrounding air. A nitrogen blanket is thus frequently required to isolate the isocyanate-containing portion from direct contact with air.

Accordingly, there is a need in the art for a polyurethane coating system exhibiting reduced toxicity, low curing temperatures, and which produces cured coatings of high flexibility that are not brittle and are easy to repair.

SUMMARY OF THE INVENTION

The present invention relates to a two-component polyurethane coating kit comprising a first component housed in a first container, the first component including at least one polyisocyanae having isocyanate groups blocked with an isocyanate blocking agent, and a second component housed in a second container, the second component including at least one isocyanate-reactive compound. The polyisocyanate and isocyanate-reactive compounds, when contacted with each other, react to form a polyurethane.

In another embodiment, the present invention relates to a method of applying a cured polyurethane coating to a substrate. The method includes the steps of providing a first component in a first container, the first component including at least one polyisocyanate having isocyanate groups blocked with an isocyanate blocking agent, providing a second component in a second container, the second component including at least one isocyanate-reactive compound, mixing the first and second components, applying the mixture to a substrate and curing the mixture on the substrate to form a polyurethane coating.

In a third embodiment, the present invention relates to an article of manufacture coated with a cured polyurethane coating applied by the coating method of the present invention.

It is the primary object of the rresent invention to provide a polyurethane coating kit of reduced toxicity which is capable of curing at temperatures below 135° C.

It is a further object of the present invention to provide polyurethane coatings which cure at temperatures below 135° C. that have low post-curing embrittlement and high flexibility.

It is a further object of the present invention to provide a method of applying a cured polyurethane coating to a substrate without posing a serious toxicity problem to the personnel applying the coating.

Other objects, advantages and features of the present invention will become apparent to those skilled in the art from the following discussion.

DETAILED DESCRIPTION OF THE PREFERRED EMBODIMENTS

The present invention was developed to improve on known two-component, two-container urethane coating kit which generally employ highly toxic, free (unblocked) polyisocyanates, some of which are released during the coating process. These two-component, two-container urethane coating systems also have a tendency to form coatings which continue to harden after curing.

Cured coatings applied according to the present invention are characterized by high flexibility and low post-curing embrittlement. Moreover, the application of the two-component, two-container polyurethane coating of the present invention is safer since little or no release of free isocyanates will occur during the application process.

The two-container system of the present invention includes a first component housed in a first container which is selected from known compounds containing isocyanate-reactive groups, preferably hydroxyl groups, which are at least difunctional for the purposes of the isocyanate-addition reaction. The second component, housed in a second container includes at least one blocked isocyanate-containing compound. The two-components of this polyurethane system are stable under standard storage conditions as long as each component is stored in a separate container.

The first component containing isocyanate-reactive groups must be at least difunctional for the purpose of the isocyanate-addition reaction. These compounds generally have an average functionality of about two to eight, preferably about two to four. These compounds generally have a molecular weight of from 400 to about 10,000, preferably from 400 to about 8,000. However, it is also possible to use low molecular weight compounds having molecular weights below 400. The only requirement is that the compounds used should not be volatile under the heating conditions, if any, used to cure the compositions.

Preferred compounds containing isocyanate-reactive hydrogen atoms are the known polyester polyols, polyether polyols, polyhydroxy polyacrylates and polycarbonates containing hydroxyl groups. In addition to these preferred polyhydroxl compounds, it is also possible in accordance with the present invention to use polyhydroxy polyacetals, polyhydroxy polyester amides, polythioethers containing terminal hydroxyl groups or sulphydryl groups or at least difunctional compounds containing amino groups, thiol groups or carboxyl groups. Mixtures of the compounds containing isocyanate-reactive hydrogen atoms may also be used. A more detailed discussion of the hydroxyl containing compounds useful in the present invention can be found in U.S. Pat. No. 4,439,593 issued on Mar. 27, 1984, which is hereby incorporated by reference.

The isocyanate-reactive compounds may be prepared by methods which are well known in the art. For example, polyethers are obtained in known manner by reaction of the starting compounds which contain reactive hydrogen atoms with alkaline oxides. Suitable starting compounds containing reactive hydrogen atoms include organic alcohols such as methanol, ethanol, ethylene glycol and propylene glycol. Other higher molecular weight alcohols may also be used.

The second component of the present invention includes at least one blocked polyisocyanate. The blocked polyisocyanates used in the compositions of the present invention preferably contain an average of about 2–6, and preferably about 2–4 blocked isocyanate groups per molecule and may be prepared from virtually any organic polyisocyanate. Most preferably, the blocked polyisocyanates are prepared from polyisocyanates containing 2-isocyanate groups. Preferred are polyisocyanates having aromatically, aliphatically or cycloaliphatically bound isocyanate groups, or mixtures thereof.

The polyisocyanates used for preparing the blocked isocyanates of the present invention may be monomeric in nature or adducts prepared from organic diisocyanates and containing biuret, allophanate, urea, urethane or carbodiimide groups or isocyanurate rings. Suitable polyisocyanates which may be used as such or as intermediates for preparing polyisocyanate adducts include ethylene diisocyanate, 1,4-tetramethylene diisocyanate, 1,6-hexamethylene diisocyanate, 2,4,4-trimethyl-1,6-hexamethylene diisocyanate, 12-dodecane diisocyanate, cyclobutane-3-diisocyanate, cyclohexane-1,3- and 1,4-diisocyanate and mixtures of these isomers, 1-isocyanato-2-isocyanatomethyl cyclopentane, 1-isocyanato-3,3,5-trimethyl-5-isocyanatomethyl cyclohexane, 2,4- and 2,6-hexahydro tolylene diisocyanate and mixtures of these isomers, diphenyl methane-2,4'- and/or 4,4'-diisocyanate, naphthalene-1,5-diisocyanate, triphenyl methane-4,4',4'''-triisocyanate, polyphenyl polymethylene polyisocyanates of the type obtained by condensing aniline with formaleehyde followed by phosgenation, and mixtures of the above-mentioned polyisocyanates. Polyisocyanate adducts containing biuret groups may be prepared from the previously mentioned diisocyanates according to the processes disclosed in U.S. Pat. Nos. 3,124,605; 3,358,010; 3,644,490; 3,862,973; 3,903,126; 3,903,127; 4,051,165; 4,147,714 or 4,220,749 by using coreactants such as water, tertiary alcohols, primary and secondary monoamines, and primary and/or secondary diamines. The preferred diisocyanates to be used in these processes is 1,6-diisocyanatohexane.

Polyisocyanate adducts containing allophanate groups may be prepared by reacting the previously mentioned diisocyanates according to the processes disclosed in U.S. Pat. Nos. 3,769,318 and 4,160,080, British Pat. No. 994,890 and German Offenlegungrachrift No. 2,040,645.

Polyisocyanate adducts containing isocyanurate groups may be prepared by trimerizing the previously mentioned diisocyanates in accordance with the processes disclosed in U.S. Pat. Nos. 3,487,080; 3,919,218; 4,040,992; 4,288,586; and 4,324,879, German Auslegeschrisft No. 1,150,080; German Offenlegungrachrift No. 2,325,826; and British Pat. No. 1,465,812. The preferred diisocyanates to be used are 2,4-diisocyanatotoluene, 2,6-diisocyanatotoluene, mixtures of these isomers, 1,6-diisocyanatohexane, isophorone diisocyanate and mixtures of the latter two diisocyanates.

Polyisocyanate adducts containing urea and or urethane groups and based on the reaction product of the previously mentioned diisocyanates and compounds containing 2 or more isocyanate-reactive hydrogens may be prepared according to the process disclosed in U.S. Pat. No. 3,183,112. In preparing polyisocyanate adducts the average isocyanate functionality is determined from the functionality of the compounds containing isocyanate-reactive hydrogens. For example, theoretically when an excess of a diisocyanate is reacted with a diol, a polyisocyanate with a functionality of approximately 2 will be produced, while a triol coreactant will result in a polyisocyanate functionality of at least 3. By using mixtures of compounds containing isocyanate-reactive hydrogens, various functionalities can be obtained. Suitable compounds containing 2 or more isocyanate-reactive hydrogens are those with molecular weights of up to 400, while the preferred diisocyanates are 2,4-diisocyanatotoluene, 2,6-diisocyanatotoluene, mixtures of these isomers, m-tetramethylxylene diisocyanate, p-tetramethylxylene diisocyanate, 1,6-diisocyanatohexane and isophorone diisocyanate.

Prior to their use in the compositions of the present invention, the polyisocyanates are blocked with C-H acidic compounds. Other blocking agents such as di-$C_1$-$C_{12}$-alkyl and/or-alkoxyalkyl, preferably a $C_1$-$C_4$-dialkyl malonates may be used. The most preferred blocking agents are methyl ethyl ketoxime, methyl amyl ketoxime and methyl isobutyl ketoxime. Preferably, these blocking agents are used as the sole blocking component for reaction with the polyisocyanates. However, it is possible to use up to about 20 mole %, preferably up to about 10 mole %, of other known blocking agents, e.g. secondary or tertiary alcohols such as isopropanol or t-butanol; oximes such as formaldoxime, acetaldoxime, butanone oxime, cyclohexanone oxime, acetophenone oxime, benzophenone oxime or diethyl glyoxime; lactams such as e-caprolactam or 8-valerolactam; phenols such as phenol or cresol; N-alkyl amides such as N-methyl acetamide; and imides such as phthalimide; imidazole; or alkali metal bisulfites. While polyisocyanates blocked with these other known blocking agents will react normally with the isocyanate-reactive component of the subject invention when using sufficiently elevated temperatures, they will not react significantly at the preferred low temperature baking conditions of the present invention and, accordingly, should only be used in the amounts specified when operating in this manner. To compensate for the low reactivity of these blocked polyisocyanates; the amount of the isocyanate-reactive component may be correspondingly reduced. The unreacted blocked polyisocyanates will remain in the cured coating and provide a softening effect. It is also possible to replace up to about 60 mole %, preferably up to about 50 mole %, of the malonate-based blocking agents with acetoacetic acid $C_1$-$C_{12}$-, preferably $C_1$-$C_4$-alkyl or-alkoxyalkyl esters such as ethylacetoacetate or ethoxyethylacetoacetate. It has been found that when acetoacetic acid esters are exclusively used as the blocking agent, the reactivity of blocked polyisocyanate towards the isocyanate-reactive component is reduced in the presence of the monofunctional stabilizer resulting in coatings which are tacky and incompletely cured. However, when equimolar mixtures of the dialkyl malonate and acetoacetic acid esters are used as the blocking agent, fully cured films are obtained from the stabilized compositions of the present invention.

A particularly preferred group of blocking agents comprises blocking agents having a deblocking temperature below about 135° C., and preferably below about 120° C.

The reaction between the polyisocyanates and the blocking agent is generally conducted at above about 50° C., or preferably at from about 60° to 100° C., optionally in the presence of a basic catalyst such as diazabicyclo octane, triethylamine, alkali metal alcoholates such as sodium methoxide or alkali metal phenolates such as sodium phenolate.

The amounts of the blocked polyisocyanate component in the first container and the component containing at least two isocyanate-reactive hydrogens in the second container are chosen so that for every isocyanate-reactive group the first component contains from about 0.3 to 3.0 and preferably from 0.8 to 1.6 and most preferably from about 0.9 to 1.1 isocyanate groups blocked by C-H acidic compounds. It is possible during the actual production of the compositions according to the present invention to use the lacquer solvents which are in any case required for their subsequent use.

Once the polyisccyanate component and the isocyanate-reactive component have been selected, the storage stability of compositions containing a blocked polyisocyanate component and an isocyanate-reactive component may be improved by incorporating a stabilizing amount of a compound having monofunctional reactivity toward isocyanate groups. The stabilizer may be added to the composition or to the individual components prior to their being mixed to form the compositions. The stabilizing compounds include primary, secondary or tertiary monoalcohols and primary or secondary monoamines having molecular weight of up to about 400. Suitable monofunctional compounds include methanol, ethanol, propanol, isopropanol, 1-butanol, 2-butanol, t-butanol, methyl amine, ethylamine, propylamine, 2-aminopropane, butylamine, 2-aminobutane, t-butylamine, ethylene glycol monoethyl ether, ethylene glycol monomethyl ether, ethylene glycol monobutyl ether, diethylene glycol monomethyl ether, diethylene glycol monoethyl ether, diethylene glycol monobutyl ether and propylene glycol monomethyl ether. Additional examples of suitable monofunctional alcohols are contained in U.S. Pat. No. 4,355,138, which is hereby incorporated by reference.

The preferred stabilizing compounds are the highly volatile, low molecular weight monoalcohols and monoamines, especially the monoalcohols, since at the baking temperatures necessary for curing the compositions, these monofunctional compounds are volatilized from the coating compositions and do not form a part of the cured coating to any substantial degree. However, when it is desired to retain the stabilizer in the cured coating, it is preferred to use monoalcohols having a vaporization point higher than the baking temperature. The retained stabilizers have a softening effect on the cured coating. The stabilizers are added in amounts greater than 0.01 %, preferably greater than about 0.5%, and most preferably greater than about 1% by weight based on the solids content of the coating composition.

The upper limit of the stabilizers is generally 20%, preferably 10%, and most preferably 5% based on the solids content of the coating composition. Even though amounts greater than about 20% by weight do not normally further improve the stability, amounts greater than 20% may be used when it is desired to also use monoalcohols as solvents for the compositions of the present invention.

As mentioned above, a solvent or solvent mixture is preferably used during production of the compositions when mixing the polyisocyanate component with the components containing isocyanate-reactive groups. this solvent or solvent mixture preferably remains in the composition until it is used. However, it is of course also possible to use a solvent simply to promote thorough mixing of the components and subsequently to distill off this solvent (in vacuo) leaving a ready-to-use mixture in solvent-free form which may be redissolved in solvents at any later stage.

Suitable solvents include the known polyurethane solvents, for example, toluene, xylene, butyl acetate, ethylacetate, ethylene glycol monoethyl ether acetate (EGA), ethylene glycol monomethyl ether acetate, ethylene glycol monobutyl ether acetate, diethylene glycol monoethyl ether acetate, diethylene glycol monomethyl ether acetate, diethylene glycol monobutyl ether acetate, propylene glycol monomethyl ether acetate, methyl ethyl ketone or methyl isobutyl ketone, hydrocarbon solvents such as hexane and heptane, aromatic solvents and also mixtures of the above solvents.

In the compositions prepared according to the present invention, the solvents are generally present in such quantities that the content of nonvolatile binder constituents is no less than abut 20%, preferably from about 30 to 80% by weight.

Additives, such as catalysts, pigments, dyes and levelling aids, may be added, as required, to the compositions of the present invention.

The compositions produced according to the present invention may be stored as such for prolonged periods at room temperature without gel formation or any other undesirable changes occurring. They may be diluted as required to a suitable concentration and applied by the conventional methods, for example spraying or spread coating, and heated, generally to temperatures in excess of about 260° F., preferably from about 260° F. to 290° F., more preferably from about 260° F. to 270° F., in order to cure the coating.

The compositions may be used as coating agents for primer, intermediate or surface coatings for a variety of different substrates. The resulting coatings possess excellent adhesion to substrates, are uniform and exhibit excellent mechanical and chemical properties and water and solvent resistance, especially hardness, impact resistance and elasticity.

The invention is further illustrated, but is not intended to be limited by the following examples in which all parts and percentages are by weight unless otherwise specified.

EXAMPLE 1

A composition in accordance with the present invention was made using the ingredients in Table 1. 1.0 parts of "A" were mixed with 2.3 parts of "B" by weight in a separate container using commercially available spray application equipment capable of automatically metering proportions of "A" and "B". The composition obtained is shown in Table 2.

The mixed components are then applied to an object to be painted using standard application techniques known in the art. These could include, but are not restricted to, air atomized spray, turbobell, electrostatic air atomized, airless spray, or roller coating techniques.

The coating is then baked in an oven after an appropriate flash time to evaporate excess solvents. The bake schedule would be approximately 30 minutes at 265° F. or equivalent.

TABLE 1

| MATERIAL | GRAMS |
|---|---|
| PART A | |
| 1. PE resin #1 AA/NPG/TMP* | 22.28 |
| 2. PE resin #2 AA/NPG/TM* | 17.82 |
| 3. UV Absorber Sanduvor 3206 | 3.75 |
| 4. Solvent Ektasolve EB Acetate | 10.0 |
| 5. Flow agent BYK-300 | 0.20 |
| 6. DBTDL | 0.30 |
| TOTAL A: | (54.35) |
| PART B | |
| 1. M-TMXDI/TMP adduct* blocked with oxime | 87.50 |
| 2. Xylene | 37.5 |
| TOTAL B: | (125.0) |

TABLE 2

FORMULA FOR COMBINED INGREDIENTS
PART A + PART B

| MATERIAL | SOLIDS | GRAMS | GRAMS NV |
|---|---|---|---|
| 1. Polyester Resin #1* Adipic Acid/NPG/TMP Poly(propylene oxide) | 80 | 22.28 | 17.82 |
| 2. Polyester Resin #2* Adipic Acid/NPG/TMP | 100 | 17.82 | 17.815 |
| 3. UV Absorber Sanduvor 3206 | 80 | 3.75 | 3.0 |
| 4. Solvent Ektasolve EB Acetate | — | 10.0 | — |
| 5. Flow Agent BYK-300 | 50 | 0.20 | 0.1 |
| 6. Dibutyl Tin Dilaurate (M&T T12) | 5 | 0.30 | 0.015 |
| 7. M-TMXDI/TMP* adduct blocked with MEK oxime | 70 | 87.50 | 61.25 |
| 8. Xylene | — | 37.5 | — |
| TOTAL: | | 179.35 | 100 |

*POLYESTER RESIN #1

| MONOMER | WT % | eq |
|---|---|---|
| Neopentyl glycol | 25.8 | 10 |
| Trimethylol propane | 10.9 | 5 |
| Adipic Acid | 37.7 | 10.6 |
| Poly(propylene oxide)polyol | 25.6 | 1. |

100% WNV GH = $Z_2$ WPG = 9.03#/gal. AN = 8.73 mg. KDH/g resin NV
Reacted using standard polymerization techniques TABLE 2-continued

*POLYESTER RESIN #2

| MONOMER | WT % |
|---|---|
| Neopentyl glycol | 34.7 |
| Trimethylol propane | 14.7 |
| Adipic Acid | 50.6 |

80% WNV
Reacted using standard polymerization techniques
*M-TMXDI/TMP adduct (Cythane 3160)
NV = 80.3
NCO, % WT = 8.92
EW = 471
Solvent = Butyl acetate/MEK (50/50)
Density (cps) = 8700

This isocyanate is blocked with an oxime such as methyl ethyl ketoxime or methylamyl ketoxime.

The foregoing description of embodiments of the present invention has been presented for purposes of illustration and description. It is not intended to be exhaustive or to limit the invention to the precise forms disclosed, and many modifications and variations will be obvious to one of ordinary skill in the art in light of the above teachings. The scope of the invention is to be defined by the claims appended hereto.

What is claimed is:

1. A two component polyurethane coating kit, comprising
   a first component housed in a first container, said first component comprising at least one polyisocyanate having isocyanate groups blocked with an isocyanate blocking agent; and
   a second component housed in a second container, said second component comprising at least one isocyanate-reactive compound; which polyisocyanate and isocyanate-reactive compounds when contacted with each other react to form a polyurethane.

2. The kit of claim 1, wherein
   the blocking agent has a de-blocking temperature lower than about 135° C.

3. The kit of claim 1, wherein
   the blocking agent has a de-blocking temperature lower than about 120° C.

4. The kit of claim 1, wherein
   the blocking agent is selected from the groups consisting of methyl ethyl ketoxime, methyl amyl ketoxime and mixtures thereof.

5. A method of applying a cured polyurethane coating to a substrate comprising
   providing a first component in a first container, said first component comprising at least one polyisocyanate having isocyanate groups blocked with an isocyanate blocking agent;
   providing a second component in second container, said second component comprising at least one isocyanate-reactive compound;
   mixing said first and second components;
   applying said mixture to a substrate; and
   curing said mixture on said substrate to form a polyurethane coating.

6. The method of claim 5, wherein
   the blocking agent has a de-blocking temperature lower than about 135° C.

7. The method of claim 5, wherein
   the blocking agent has a de-blocking temperature lower than about 120° C.

8. An article of manufacture having a cured polyurethane coating of low post-curing embrittlement and high flexibility made by a method comprising
   providing a first component in a first container, said first component comprising at least one polyisocyanate having isocyanate groups blocked with an isocyanate blocking agent;
   providing a second component in a second container, said second component comprising at least one isocyanate-reactive compound;
   mixing said first and second components;
   applying said mixture onto a substrate; and
   curing said mixture on said substrate to form a polyurethane coating on said substrate.

* * * * *